US011606629B2

(12) United States Patent
Suzuki

(10) Patent No.: US 11,606,629 B2
(45) Date of Patent: Mar. 14, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Mai Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 294 days.

(21) Appl. No.: 16/516,260

(22) Filed: Jul. 19, 2019

(65) Prior Publication Data

US 2020/0037049 A1  Jan. 30, 2020

(30) Foreign Application Priority Data

Jul. 26, 2018 (JP) .............................. JP2018-140118

(51) Int. Cl.
*H04N 21/8545* (2011.01)
*G10L 15/26* (2006.01)
(Continued)

(52) U.S. Cl.
CPC ......... *H04N 21/8545* (2013.01); *G06V 20/46* (2022.01); *G09B 5/065* (2013.01);
(Continued)

(58) Field of Classification Search
CPC ........... H04N 21/8545; H04N 21/8548; H04N 21/8549; G06K 9/00744; G06K 9/00751; G06K 9/00758; G09B 5/065; G09B 5/067; G09B 5/12; G09B 5/125; G09B 5/06; G09B 19/06; G10L 15/26; G10L 15/28; G10L 2015/0638; G10L 2015/225; G10L 2015/226; G10L 2015/227;
(Continued)

(56) References Cited

U.S. PATENT DOCUMENTS

| 6,748,358 B1* | 6/2004 | Iwasaki .................. G10L 13/00 |
| | | 704/258 |
| 6,901,166 B1* | 5/2005 | Nakayama ........... G06V 30/142 |
| | | 392/311 |
| 2003/0206647 A1* | 11/2003 | Yamamichi ............. G06K 9/03 |
| | | 382/128 |
| 2005/0027525 A1* | 2/2005 | Funakura ............... G10L 17/26 |
| | | 704/235 |
| 2006/0092487 A1* | 5/2006 | Kuwabara .......... H04N 1/00132 |
| | | 358/537 |

(Continued)

FOREIGN PATENT DOCUMENTS

| JP | 2005065191 | 3/2005 |
| JP | 2009294984 | 12/2009 |

OTHER PUBLICATIONS

"Office Action of Japan Counterpart Application" with English translation thereof, dated May 10, 2022, p. 1-p. 5.

*Primary Examiner* — Bhavesh M Mehta
*Assistant Examiner* — Darioush Agahi
(74) *Attorney, Agent, or Firm* — JCIPRNET

(57) ABSTRACT

An information processing apparatus includes an acquisition unit that acquires voice data and image data, respectively, a display control unit that performs control to display the image data acquired by the acquisition unit in synchronization with the voice data, a reception unit that receives a display element to be added for display to a specific character in the image data displayed by the display control unit, and a setting unit that sets a playback period in which the specific character in the voice data is played back, as a display period of the display element received by the reception unit in the image data.

17 Claims, 17 Drawing Sheets

(51) Int. Cl.
    *G09B 5/06*           (2006.01)
    *G09B 5/12*           (2006.01)
    *G06V 20/40*         (2022.01)
    *G10L 15/22*         (2006.01)
    *G10L 15/06*         (2013.01)

(52) U.S. Cl.
    CPC ................ *G09B 5/12* (2013.01); *G10L 15/26* (2013.01); *G10L 2015/0638* (2013.01); *G10L 2015/225* (2013.01)

(58) Field of Classification Search
    CPC .............. G10L 2015/228; G10L 13/00; G06V 20/46; G06V 30/10; G06V 30/153
    See application file for complete search history.

(56) References Cited

U.S. PATENT DOCUMENTS

| | | | |
|---|---|---|---|
| 2007/0058868 A1* | 3/2007 | Seino ................. | G06F 3/03545 |
| | | | 382/187 |
| 2008/0177786 A1* | 7/2008 | Faisman ................ | G06F 40/58 |
| 2009/0292540 A1* | 11/2009 | Liu ........................ | G10L 15/22 |
| | | | 704/E15.005 |
| 2011/0227881 A1* | 9/2011 | Misawa .............. | G06F 3/03545 |
| | | | 345/179 |
| 2014/0208209 A1* | 7/2014 | Na ........................ | G06F 3/0236 |
| | | | 715/728 |
| 2014/0373082 A1* | 12/2014 | Miyazaki ........... | H04N 21/4415 |
| | | | 725/110 |
| 2018/0137778 A1* | 5/2018 | Ichihashi ................ | G09B 7/02 |
| 2019/0028721 A1* | 1/2019 | Rutschman ............ | H04N 19/33 |

\* cited by examiner

FIG. 10

| KEYWORD | PLAYBACK START TIME | PLAYBACK END TIME | PLAYBACK |
|---|---|---|---|
| EXPLAIN | 00:00:04.7 | 00:00:04.9 | ▶ ■ |
| ENGLISH | 00:00:05.2 | 00:00:05.9 | ▶ ■ |
| EDUCATION PRACTICE | 00:00:07.1 | 00:00:07.4 | ▶ ■ |
| ENGLISH EDUCATION | 00:00:25.7 | 00:00:32.4 | ▶ ■ |
| FOREIGN LANGUAGE TEACHING ASSISTANT | 00:01:05 | 00:01:09 | ▶ ■ |
| ALT | 00:02:48 | 00:02:56 | ▶ ■ |
| ALT | 00:03:02 | 00:03:20 | ▶ ■ |
| アシスタントランゲージティーチャー | 00:04:29 | 00:04:34 | ▶ ■ |
| BOARD OF EDUCATION | 00:05:04 | 00:05:12 | ▶ ■ |

FIG. 15A

VOICE RECOGNITION RESULT (SENTENCE)

Hello. Well then, today I will explain English education practice.

English education is carried out with a foreign language teaching assistant called ALT. ALT stands for アシスタントラングエージティーチャー and will be dispatched to school by the Board of Education. Enhance foreign language education and promote international exchange...

FIG. 15B

VOICE RECOGNITION RESULT (WORD)

| KEYWORD | PLAYBACK START TIME | PLAYBACK END TIME | PLAYBACK |
|---|---|---|---|
| EXPLAIN | 00:00:04.7 | 00:00:04.9 | ▷ ■ |
| ENGLISH | 00:00:05.2 | 00:00:05.9 | ▷ ■ |
| EDUCATION PRACTICE | 00:00:07.1 | 00:00:07.4 | ▷ ■ |
| ⋮ | ⋮ | ⋮ | ⋮ |
| ENGLISH EDUCATION | 00:00:25.7 | 00:00:32.4 | ▷ ■ |
| FOREIGN LANGUAGE TEACHING ASSISTANT | 00:01:05 | 00:01:09 | ▷ ■ |
| ALT | 00:02:48 | 00:02:56 | ▷ ■ |
| ALT | 00:03:02 | 00:03:20 | ▷ ■ |
| アシスタントラングエージティーチャー | 00:04:29 | 00:04:34 | ▷ ■ |
| BOARD OF EDUCATION | 00:05:04 | 00:05:12 | ▷ ■ |

FIG. 17

PREVIEW SCREEN

WITH RESPECT TO ENGLISH EDUCATION PRACTICE

- ALT: FOREIGN LANGUAGE TEACHING ASSISTANT
  - Abbreviation of "Assistant Language Teacher"
  - Dispatched by Board of Education
- DISPATCH PURPOSE
  - Enhancement of foreign language education
  - International exchange

70

61

0:00:30.0

| WITH RESPECT TO EDUCATION PRACTICE IN TEACHER TRAINING COURSE | WITH RESPECT TO ENGLISH EDUCATION PRACTICE ****** ****** ****** | WITH RESPECT TO MATHEMATICS EDUCATION PRACTICE ****** ****** ****** | WITH RESPECT TO JAPANESE EDUCATION PRACTICE ****** ****** ****** |
|---|---|---|---|
| 4.10.2018 | 2. EXPLANATION OUTLINE 1 | 3. EXPLANATION OUTLINE 2 | 4. EXPLANATION OUTLINE 3 |
| 1. TITLE | | | |

| COMMAND | INFORMATION |
|---|---|
| 0:00:00.0 : PAGE SWITCHING | 1. TITLE |
| 0:00:25.7 : PAGE SWITCHING | 2. EXPLANATION OUTLINE 1 |
| ⇨ 0:00:04.29 : | POINTER RED DISPLAY |
| ⇨ 0:00:04.34 : | POINTER RED HIDE |

VOICE RECOGNITION RESULT (SENTENCE)

Hello. well then, today I will explain English education practice.

English education is carried out with a foreign language teaching assistant called ALT. ELT stands for アシスタントラングエージティーチャー and will be dispatched to school by the Board of Education. Enhance foreign language education and promote international exchange...

FIG. 18B

VOICE RECOGNITION RESULT (WORD)

| KEYWORD | PLAYBACK START TIME | PLAYBACK END TIME | PLAYBACK |
|---|---|---|---|
| EXPLAIN | 00:00:04.7 | 00:00:04.9 | ▷ ▪ |
| ENGLISH | 00:00:05.2 | 00:00:05.9 | ▷ ▪ |
| EDUCATION PRACTICE | 00:00:07.1 | 00:00:07.4 | ▷ ▪ |
| ENGLISH EDUCATION | 00:00:25.7 | 00:00:32.4 | ▷ ▪ |
| FOREIGN LANGUAGE TEACHING ASSISTANT | 00:01:05 | 00:01:09 | ▷ ▪ |
| ALT | 00:02:48 | 00:02:56 | ▷ ▪ |
| ELT | 00:03:02 | 00:03:20 | ▷ ▪ |
| アシスタントラングエージティーチャー | 00:04:29 | 00:04:34 | ▷ ▪ |
| BOARD OF EDUCATION | 00:05:04 | 00:05:12 | ▷ ▪ |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-140118 filed Jul. 26, 2018.

BACKGROUND (i) Technical Field

The present invention relates to an information processing apparatus and a non-transitory computer readable medium storing a program.

(ii) Related Art

JP2005-065191A discloses an apparatus for automatically creating moving image metadata including moving image input means for inputting moving image data including voice data; voice separation means for extracting voice data and time information on moving image data in which the voice data is recorded, from the moving image data; a voice recognition dictionary in which a phrase specifying a spatial position on a moving image and a phrase as metadata are registered in advance; voice recognition means for separately extracting the phrase specifying the spatial position on the moving image and the phrase as metadata from the voice data by recognizing voice data with reference to the voice recognition dictionary, and converting each of the phrases into character data; and metadata storage means for storing, as metadata, the spatial position on the moving image, character data of the phrase as metadata, and time information in association with each other.

JP2009-294984A discloses a material data editing system including material display means for displaying materials based on material data; an instructed portion information acquisition means for acquiring position information of an instructed portion specified by a user's instruction operation among the materials displayed by the material display means; attention level calculation means for calculating an attention level based on an operation form of the instruction operation, for the instructed portion from of which the position information is acquired by the instructed portion information acquisition means; and material data editing means for editing material data corresponding to the instructed portion according to the attention level calculated by the attention level calculation means, and generating material editing data which can be displayed with the editing result reflected.

SUMMARY

Aspects of non-limiting embodiments of the present disclosure relate to an information processing apparatus and a non-transitory computer readable medium storing a program, capable of easily setting a display period of a display element to be added in a image to be displayed, in a case of displaying a image in synchronization with voice, as compared with a case of designating and setting a display start time and a display end time.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquisition unit that acquires voice data and image data, respectively; a display control unit that performs control to display the image data acquired by the acquisition unit in synchronization with the voice data; a reception unit that receives a display element to be added for display to a specific character in the image data displayed by the display control unit; and a setting unit that sets a playback period in which the specific character in the voice data is played back, as a display period of the display element received by the reception unit in the image data.

BRIEF DESCRIPTION OF THE DRAWINGS

Exemplary embodiment(s) of the present invention will be described in detail based on the following figures, wherein:

FIG. 10 is a diagram showing a playback period for each keyword extracted from the voice recognition result;

FIG. 15A is a diagram showing a part (sentence) of an entire sentence of a voice recognition result; and FIG. 15B is a diagram showing keywords (words) extracted from the voice recognition result and a playback period of each keyword;

FIG. 17 is a diagram showing an example of a display screen of a preview screen in a case where the pointer 70 is added to the specified character string in the image data to be displayed in synchronization with voice data;

FIG. 18A shows a part (sentence) of an entire sentence of a voice recognition result, and is a diagram showing an example of a display screen in a case where the voice recognition result is incorrect; FIG. 18B shows keywords (words) extracted from the voice recognition result and a playback period of each keyword, and is a diagram showing an example of a display screen in a case where the voice recognition result is incorrect.

DETAILED DESCRIPTION

Hereinafter, an exemplary embodiment of the present invention will be described in detail with reference to the accompanying drawings.

Figure 1:
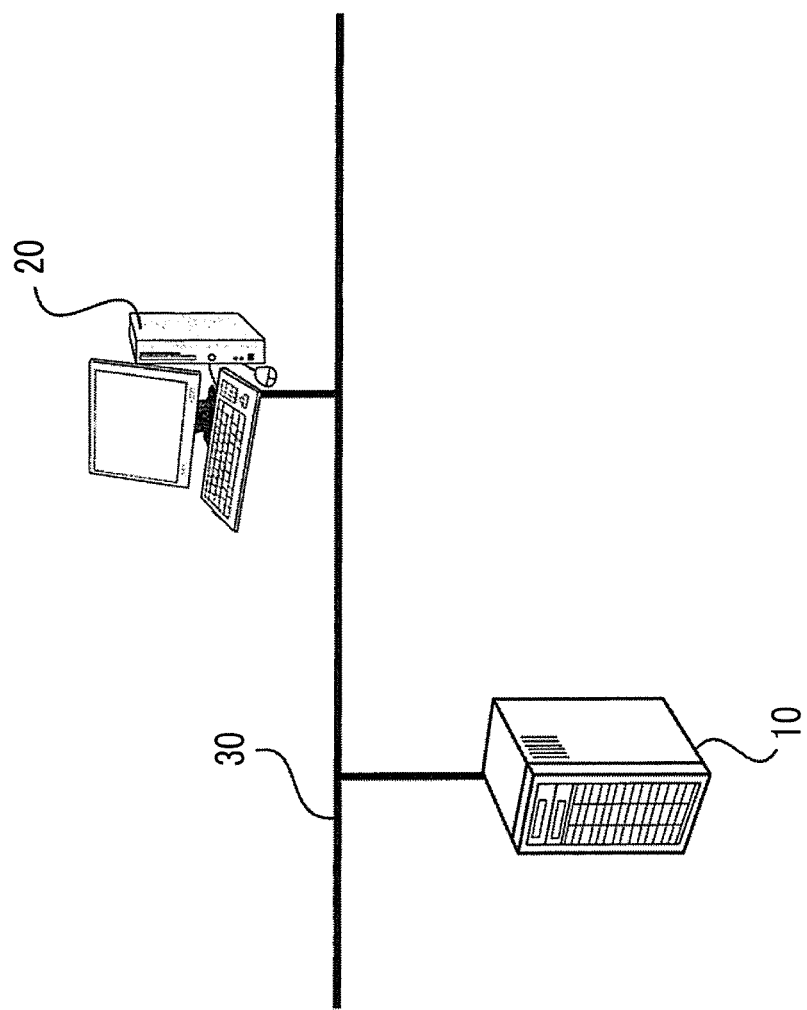
FIG. 1 is a system diagram showing a configuration of a multimedia content generation system according to an exemplary embodiment of the present invention.

FIG. 1 is a system diagram showing a configuration of a multimedia content generation system according to an exemplary embodiment of the present invention.

As illustrated in FIG. 1, the multimedia content generation system according to the exemplary embodiment of the present invention includes an editing processing server 10 and a terminal device 20 such as a personal computer which are connected to each other by a network 30.

The multimedia content generation system according to the present exemplary embodiment generates multimedia contents in which various contents such as moving images, images, voices, and characters are combined. According to the multimedia content generation system according to the present exemplary embodiment, it is possible to generate multimedia contents obtained by recording, for example, a lecture or explanation using presentation materials and displaying a display object (display element) such as a pointer (arrow), a character, a symbol, a memo, an underline, shading, and a surrounding frame, in a portion of presentation materials which is desired to be emphasized, in synchronization with voice.

The editing processing server 10 is an information processing apparatus in which editing software for editing such various contents and generating multimedia contents is installed. Then, the terminal device 20 captures image data and voice data, and generates multimedia contents by using the editing software operating on the editing processing server 10.

Instead of installing the editing software on the editing processing server 10, it is also possible to directly install and use the editing software on the terminal device 20 such as a personal computer.

Figure 2:
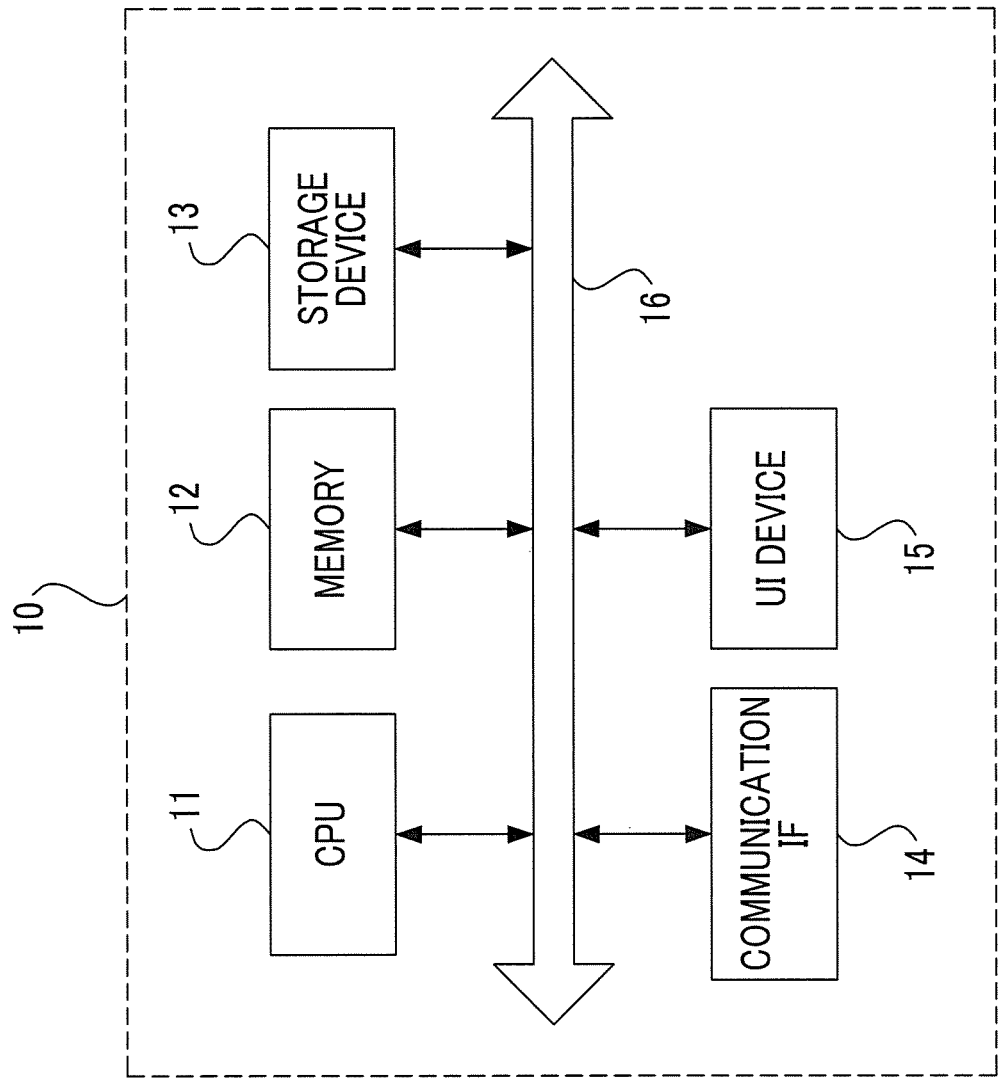
FIG. 2 is a block diagram illustrating a hardware configuration of an editing processing server 10 according to the exemplary embodiment of the present invention.

Next, the hardware configuration of the editing processing server 10 in an image forming system of the present exemplary embodiment is shown in FIG. 2.

As shown in FIG. 2, the editing processing server 10 includes a CPU 11, a memory 12, a storage device 13 such as a hard disk drive (HDD), a communication interface (IF) 14 that transmits and receives data to and from an external device such as the terminal device 20 through the network 30, and a user interface (UI) device 15 including a touch panel or a liquid crystal display and a keyboard. These components are connected to each other through a control bus 16.

The CPU 11 executes a predetermined process based on a control program stored in the memory 12 or the storage device 13 to control the operation of the editing processing server 10. In the present exemplary embodiment, it is described that the CPU 11 reads and executes the control program stored in the memory 12 or the storage device 13, but it is also possible to store the program in a storage medium such as a CD-ROM and to provide the program to the CPU 11.

Figure 3:
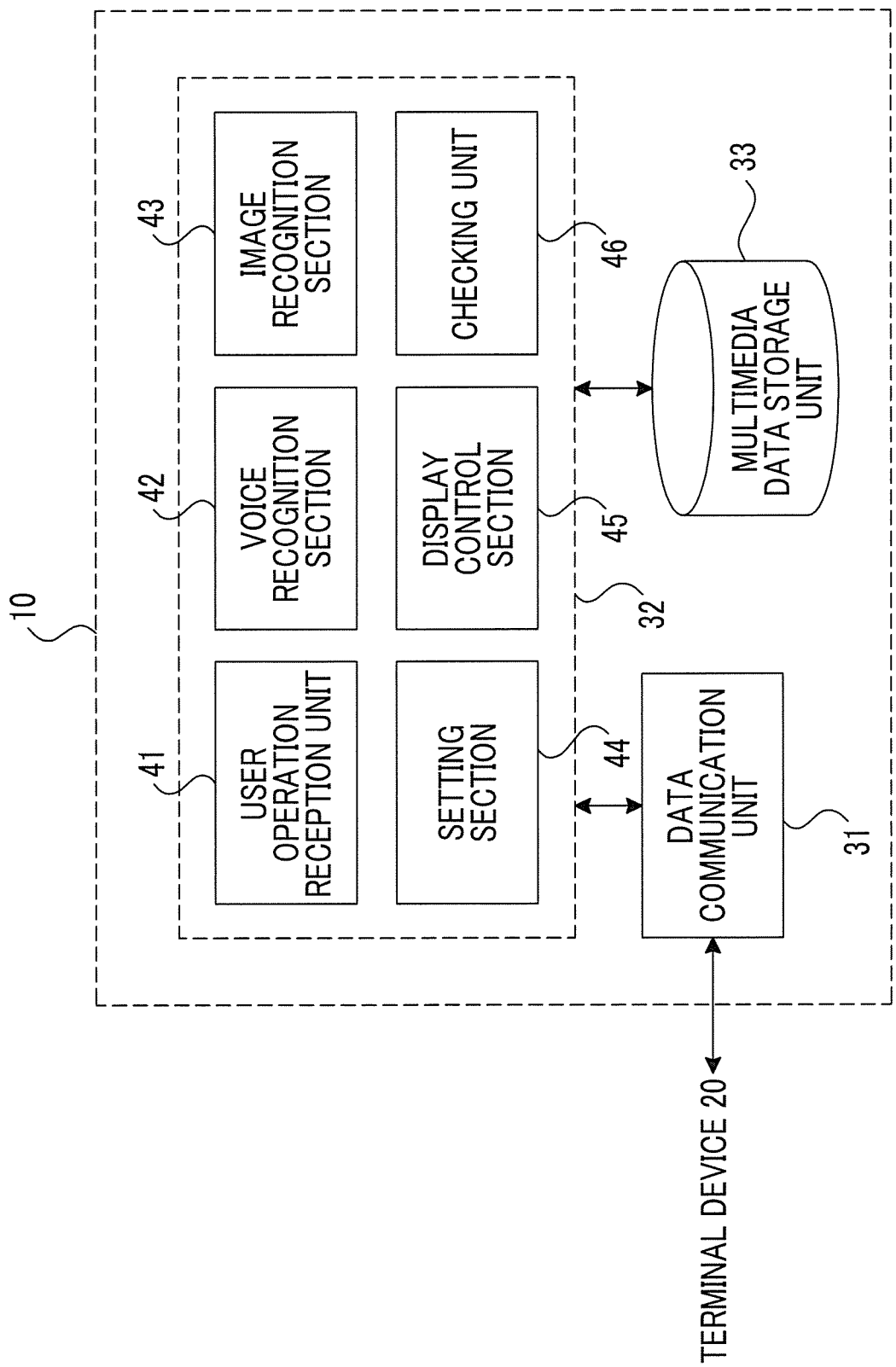
FIG. 3 is a block diagram illustrating a functional configuration of the editing processing server 10 according to the exemplary embodiment of the present invention.

FIG. 3 is a block diagram illustrating a functional configuration of the editing processing server 10 realized by executing the control program.

As illustrated in FIG. 3, the editing processing server 10 according to the present exemplary embodiment includes a data communication unit 31, a control unit 32, and a multimedia data storage unit 33.

The data communication unit 31 performs data communication with the terminal device 20 through the network 30. Further, the data communication unit 31 functions as an acquisition unit that acquires voice data, image data such as presentation materials, and the like.

The control unit 32 controls the operation of the editing processing server 10, and includes a user operation reception unit 41, a voice recognition section 42, an image recognition section 43, a setting section 44, a display control section 45, and a checking unit 46.

The multimedia data storage unit 33 stores various items of content data such as moving image data, image data, and voice data, which are to be edited, voice text data which is a voice recognition processing result, and image text data which is an image recognition result.

The user operation reception unit 41 receives the specific character in the image data, designated by the user. That is, the user operation reception unit 41 receives an instruction to set an addition timing to add a display object in the image data. Specifically, for example, an instruction to set the addition timing to add a pointer to the character string specified by the user in the presentation material is received.

Here, the specific character is a character string disposed in an area which is to be emphasized in the image data by the user and to which the display object is added.

The voice recognition section 42 performs a voice recognition process on voice data. That is, the voice data is converted into text and converted into voice text data. Further, the voice recognition section 42 extracts a keyword (word) which is a character string from the voice text data, and acquires the playback start time and the playback end time (playback period) of each keyword in the voice data.

The image recognition section 43 performs an image recognition process on a specific character received by designation by the user in the image data. That is, image data of the specific character is converted into text and converted into image text data.

The display control section 45 controls the screen displayed on the terminal device 20.

That is, the display control section 45 performs control to display the voice text data converted into text by the voice recognition section 42, on the display unit of the terminal device 20. The display control section 45 performs control to display a list of keywords extracted from the voice text data converted into text by the voice recognition section 42. Further, the display control section 45 performs control to display a list of keywords extracted from the voice text data converted into text by the voice recognition section 42, and display the playback start time and the playback end time (playback period) of each keyword in the voice data.

Further, the display control section 45 performs control to display the image text data of the specific character converted into text by the image recognition section 43, on the display unit of the terminal device 20.

The setting section 44 extracts a character string (keyword) matching the image text data of the specific character converted into text by the image recognition section 43, among voice text data converted into text by the voice recognition section 42, and sets the playback period in which the keyword corresponding to the specific character in the voice data is played back as the display period of the display object received by the user operation reception unit 41 in the image data.

In other words, the setting section 44 matches the voice text data which is the voice recognition result with the image text data which is the image recognition result of the specific character to associate the voice recognition result with the image recognition result, and sets the playback start time and the playback end time of the keyword corresponding to the specific character in the voice data as the display start time and the display end time of the display object.

Specifically, for example, the setting section 44 sets a minute and a second elapsed from the playback start time of the voice at which a pointer is displayed on a specific character of the presentation material, and a minute and a second elapsed from the playback start time of the voice at which a pointer is hidden.

In a case where a plurality of keywords corresponding to the specific character received by the user operation reception unit 41 are included in the voice data, the display control section 45 performs control to display the playback start time and the playback end time of each keyword as candidates.

The display control section 45 performs control to display the entire sentence of the voice text data converted into text by the voice recognition section 42. That is, the keyword converted into the voice text data is displayed together with contexts before and after the keyword. Then, the display control section 45 performs control to display the keyword corresponding to the specific character as a candidate by changing the display from other character strings, such as surrounding the keyword corresponding to the specific character with a frame, shading the keyword, and displaying the keyword with a different color from other character strings.

Even in a case where a keyword corresponding to the specific character is not detected in the voice data, the display control section 45 performs control to display keywords possibly corresponding to the specific character. The display control section 45 performs control such that the user can add candidates for a read representation that may be included in the voice data as the specific character. Further, the display control section 45 performs control to suggest to the user candidates for a read representation that may be included in the voice data as the specific character.

The checking unit 46 causes the user to check the voice recognition result before setting the display object in the image data to be displayed. The checking unit 46 functions as a playback unit that plays back voice data before and after appearance of a keyword possibly corresponding to a specific character, and causes the user to check the voice data.

Then, in a case where the voice text data converted into text by the voice recognition section 42 is incorrect, the user can correct the voice text data on the display screen of the terminal device 20. Further, in a case where the image text data converted into text by the image recognition section 43 is incorrect, it is possible to correct the image text data on the display screen of the terminal device 20.

Then, the display control section 45 performs control such that the image data acquired by the data communication unit 31 is displayed in synchronization with the voice data acquired by the data communication unit. Further, the display control section 45 performs control to display the display object on the specific character of the image data in accordance with the playback time of the keyword (specific character) in the voice data.

Here, a screen to be displayed in the case of setting the time for changing the display page of the image data in synchronization with the voice data is referred to as a preview screen, and a screen to be displayed in the case of setting to add a display object on the image data displayed in synchronization with the voice data is referred to as an authoring tool screen.

On the preview screen, a plurality of pieces of image data to be switched and displayed are displayed while playing back the voice, and it is possible to instruct the setting of the switching timing by selecting the image data to be switched at the timing at which switching of the image data is desired.

Further, on the authoring tool screen, by acquiring voice data and image data, and specifying the specific character in the image data to which the user wants to add the display object, the display position and the display period of the display object are set in synchronization with the voice data.

Next, the operation of the editing processing server 10 in the multimedia content generation system of the present exemplary embodiment will be described in detail with reference to the drawings.

Figure 4:
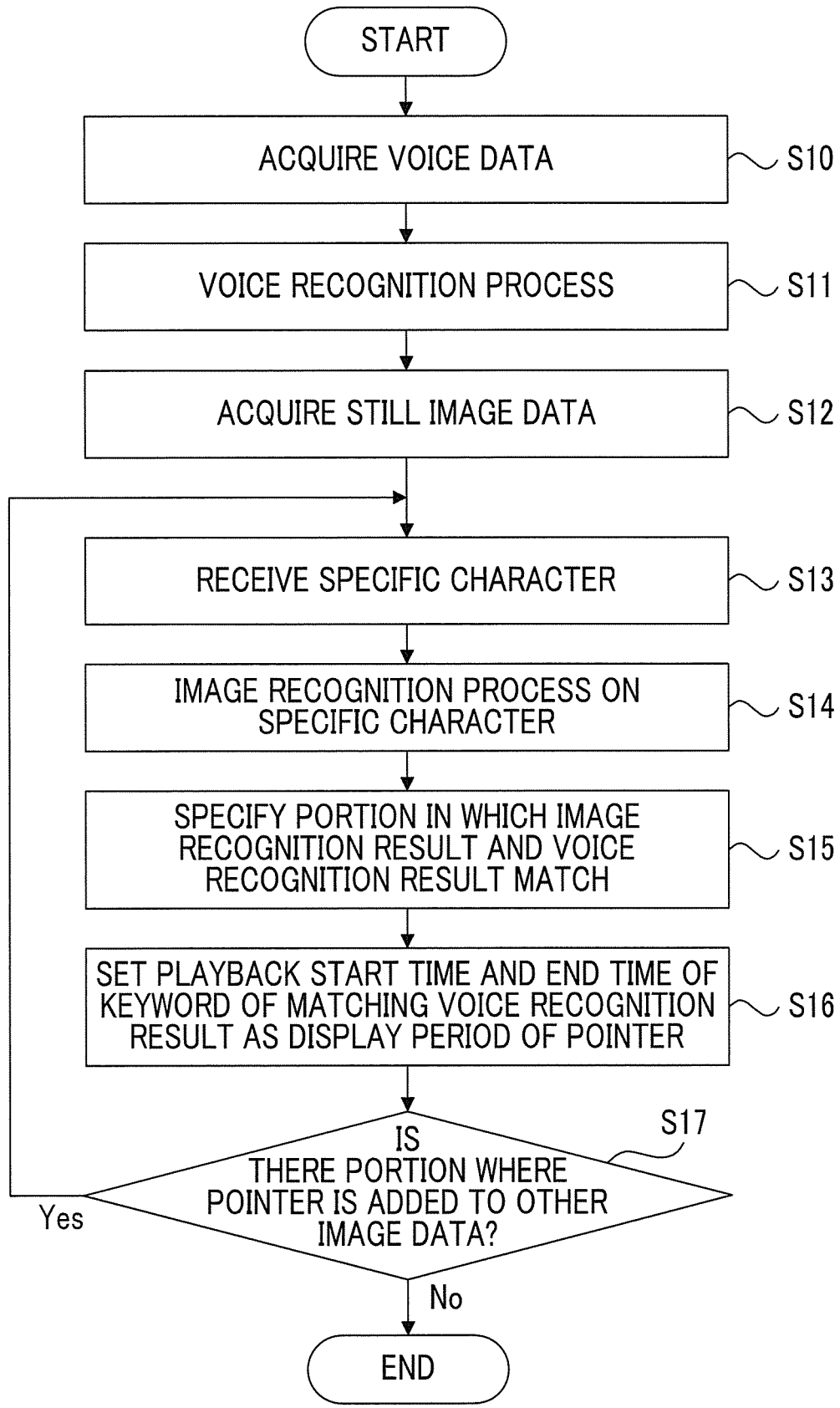
FIG. 4 is a flowchart showing an outline of a process in the editing processing server 10 according to the exemplary embodiment of the present invention.

First, the outline of the operation of the editing processing server 10 will be described with reference to the flowchart of FIG. 4.

Figure 5:
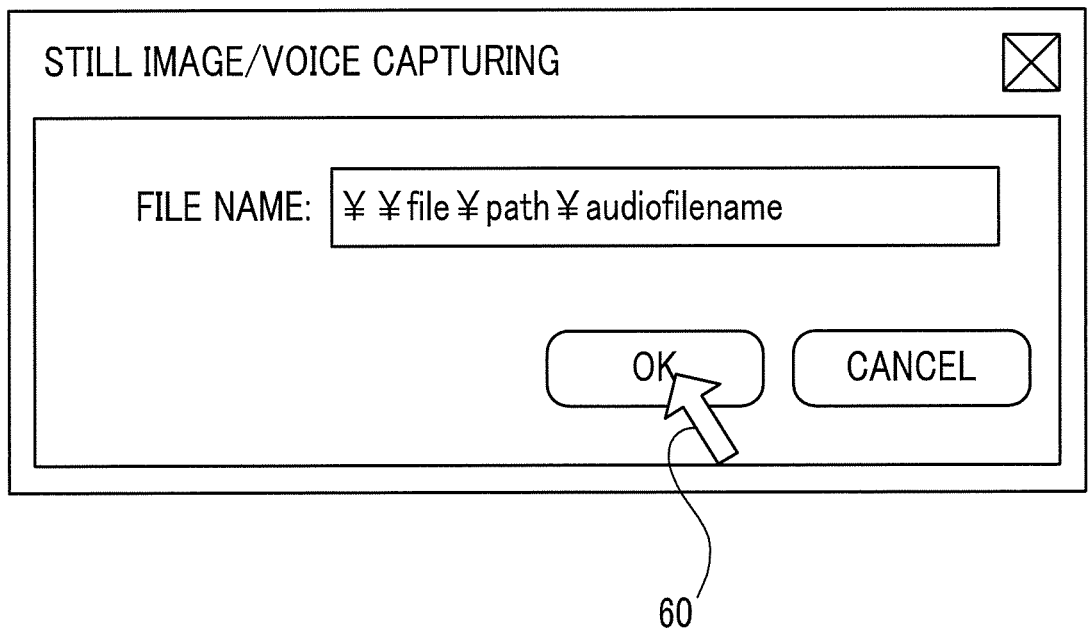
FIG. 5 is a diagram showing an example of a display screen of a terminal device 20 in a case of selecting a file to start image/voice capturing.

For example, in a case where on the display unit of the terminal device 20, a image/voice capturing screen as shown in FIG. 5 is displayed, a file storing voice data such as recorded data of a lecture is selected and "OK" is selected by the cursor 60, the editing processing server 10 acquires voice data from the terminal device 20 (step S10), and stores the voice data in the multimedia data storage unit 33.

Figure 6:
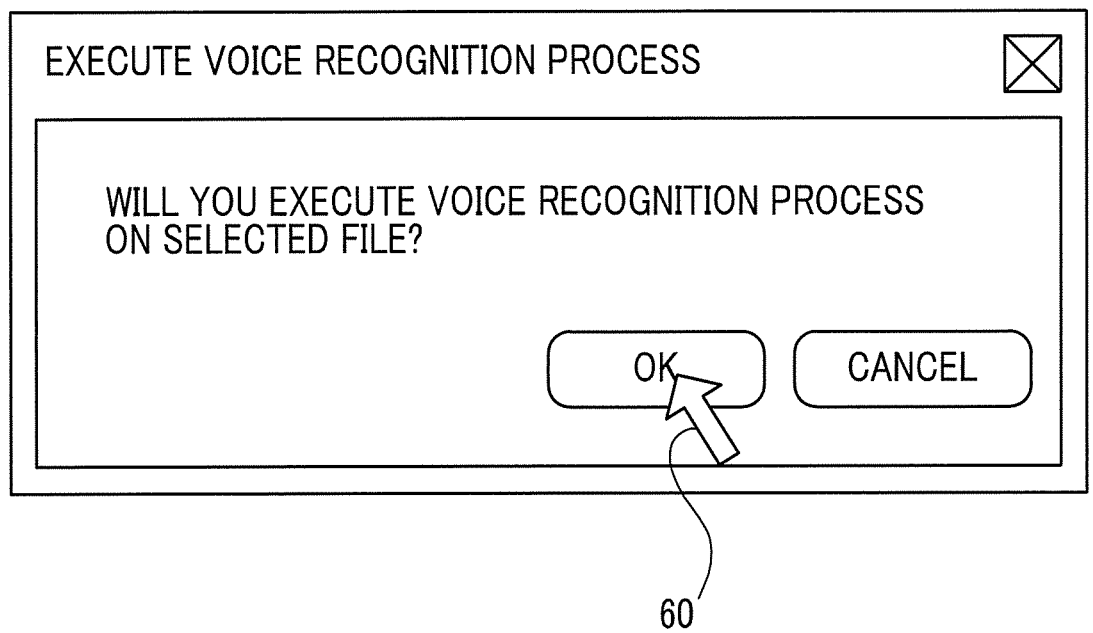
FIG. 6 is a diagram showing an example of a display screen of the terminal device 20 in a case where a voice recognition process is performed on the file selected in FIG. 5.
Figure 7:
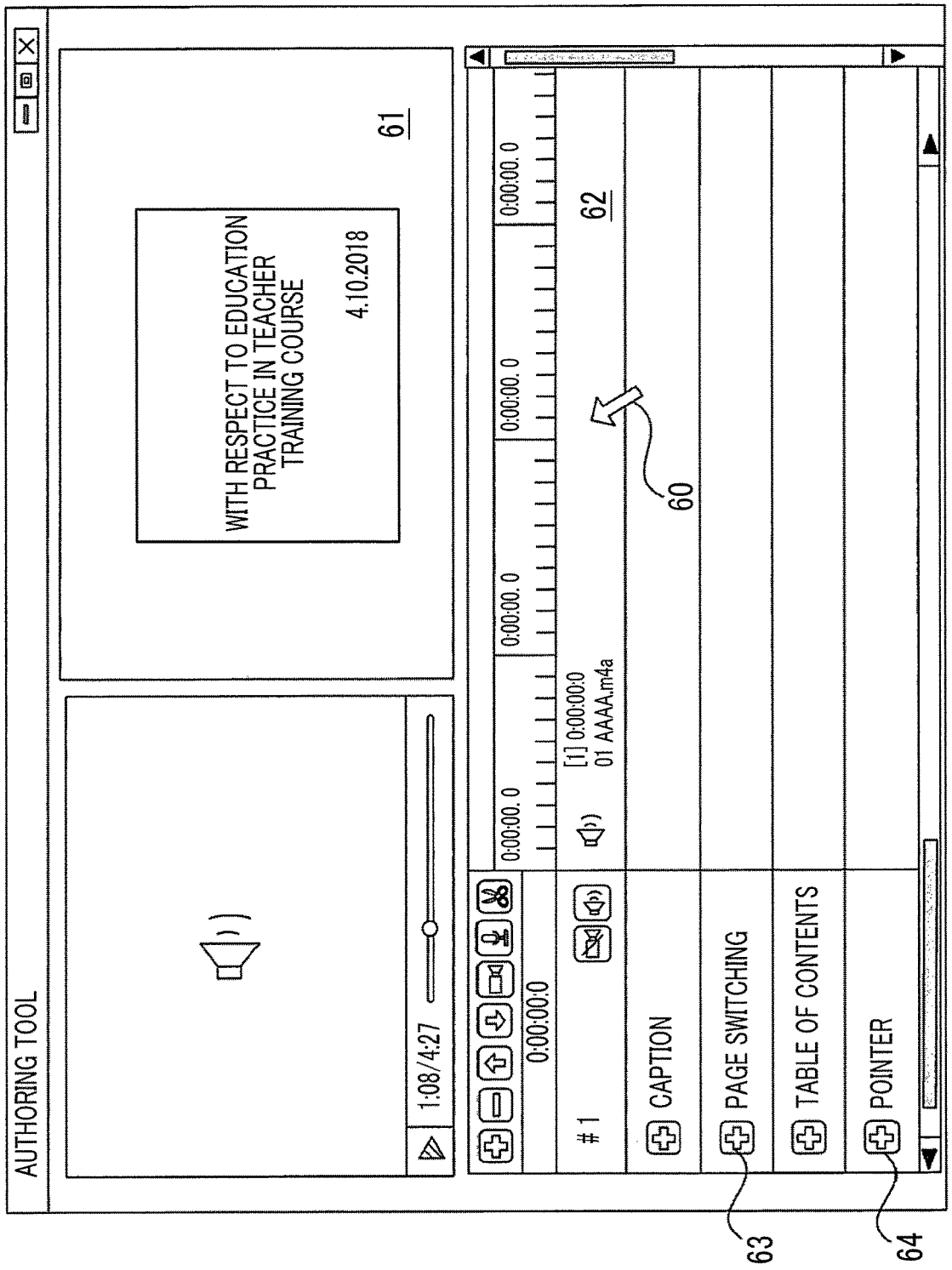
FIG. 7 is a diagram showing an example of an authoring tool screen for generating multimedia contents.

Then, in a case where on the display unit of the terminal device 20, an execution screen of the voice recognition process as shown in FIG. 6 is displayed, and "OK" is selected, the voice recognition section 42 of the editing processing server 10 executes the voice recognition process on the voice data stored in the multimedia data storage unit 33 (step S11), and the editing processing server 10 acquires voice text data converted into text by the voice recognition process. Further, the voice recognition section 42 extracts the keywords (words) included in the voice text data from the voice text data, and acquires the playback start time and the playback end time of each keyword in the voice data. An authoring tool screen as shown in FIG. 7 is displayed on the display unit of the terminal device 20.

Figure 8:
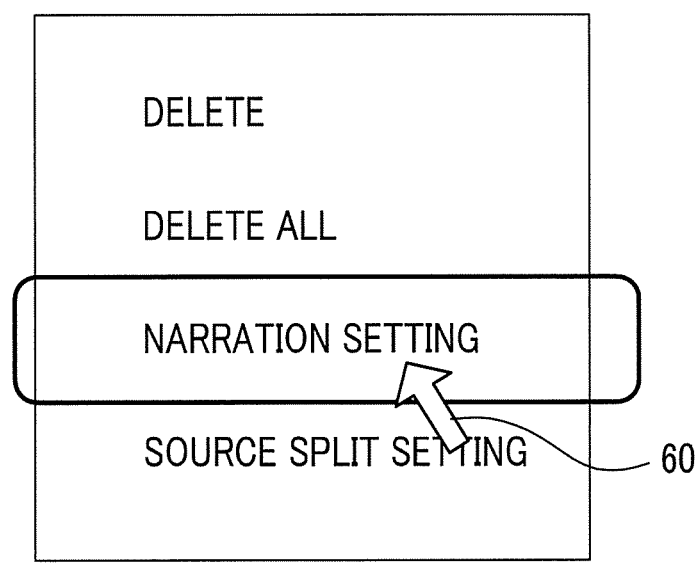
FIG. 8 is a diagram for explaining an operation in a case of displaying a voice recognition result, on the authoring tool screen.
Figure 9:
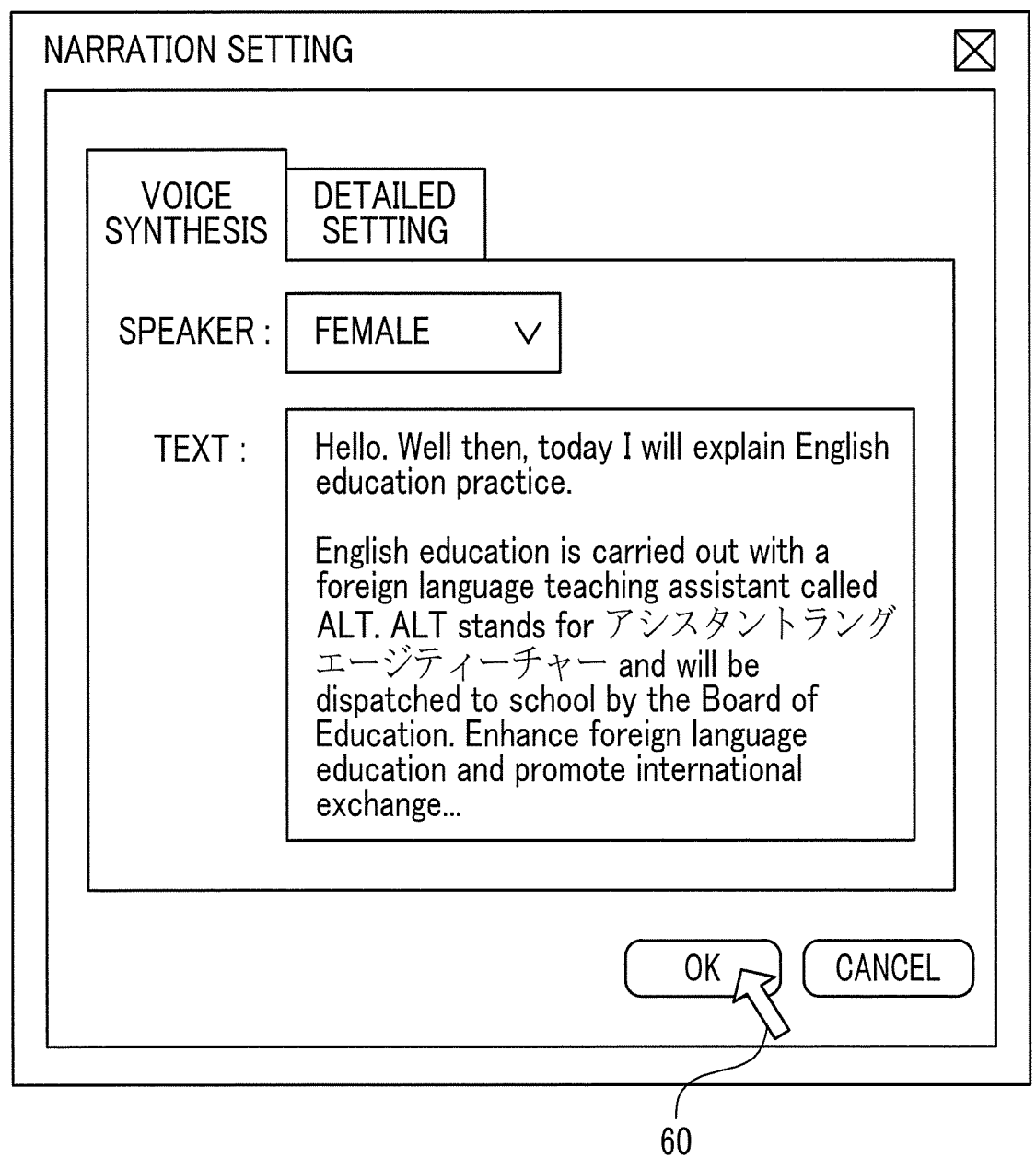
FIG. 9 is a diagram showing an example of a display screen showing a voice recognition result.

Then, in a case where the cursor 60 is right-clicked on the tool bar 62 of the authoring tool screen, a command as shown in FIG. 8 is displayed. In a case where the narration setting is selected, a narration setting screen as shown in FIG. 9 is displayed, and the entire sentence of the voice text data is displayed. That is, the entire sentence (sentence) of the voice recognition result is displayed. By switching the display mode, the playback start time, playback end time, and the playback button of each keyword included in the voice text data as shown in FIG. 10 are displayed. That is, each keyword (word) is displayed together with the playback period and playback button.

The playback start time and the playback end time of each keyword as shown in FIG. 10 are acquired using the entire sentence of the voice text data shown in FIG. 9. That is, by using the entire sentence of the voice text data, how many characters each keyword is separated from the beginning of the sentence is extracted, and for example, assuming that one character is read at one second interval, the playback start time and the playback end time of the keyword is specified and acquired.

Even though there is a keyword spoken a plurality of times in the voice data, by referring to the entire sentence of the voice recognition result as shown in FIG. 9, it is possible to specify the playback start time and the playback end time of the specific character to which the pointer is to be added from before and after the context. Further, as shown in FIG. 10, by referring to the playback start time and the playback end time of each keyword, it is possible to specify the playback start time and the playback end time of the specific character to which the pointer is to be added. By pressing the playback button of each keyword, voice data before and after each keyword (from keyword utterance until after utterance) is played back.

Figure 11:
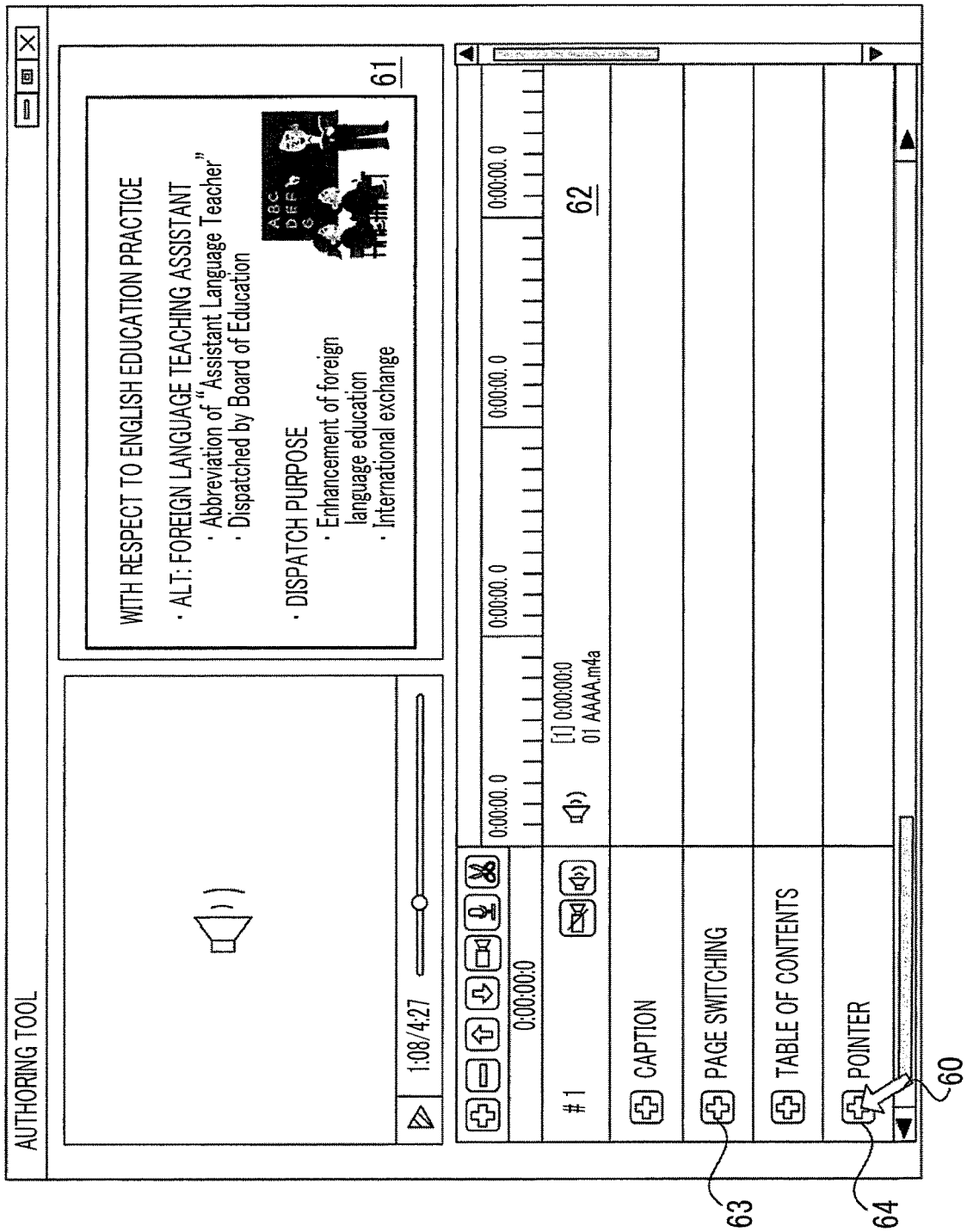
FIG. 11 is a diagram for explaining an operation in a case where a pointer 70 is added to image data, on the authoring tool screen.
Figure 12:
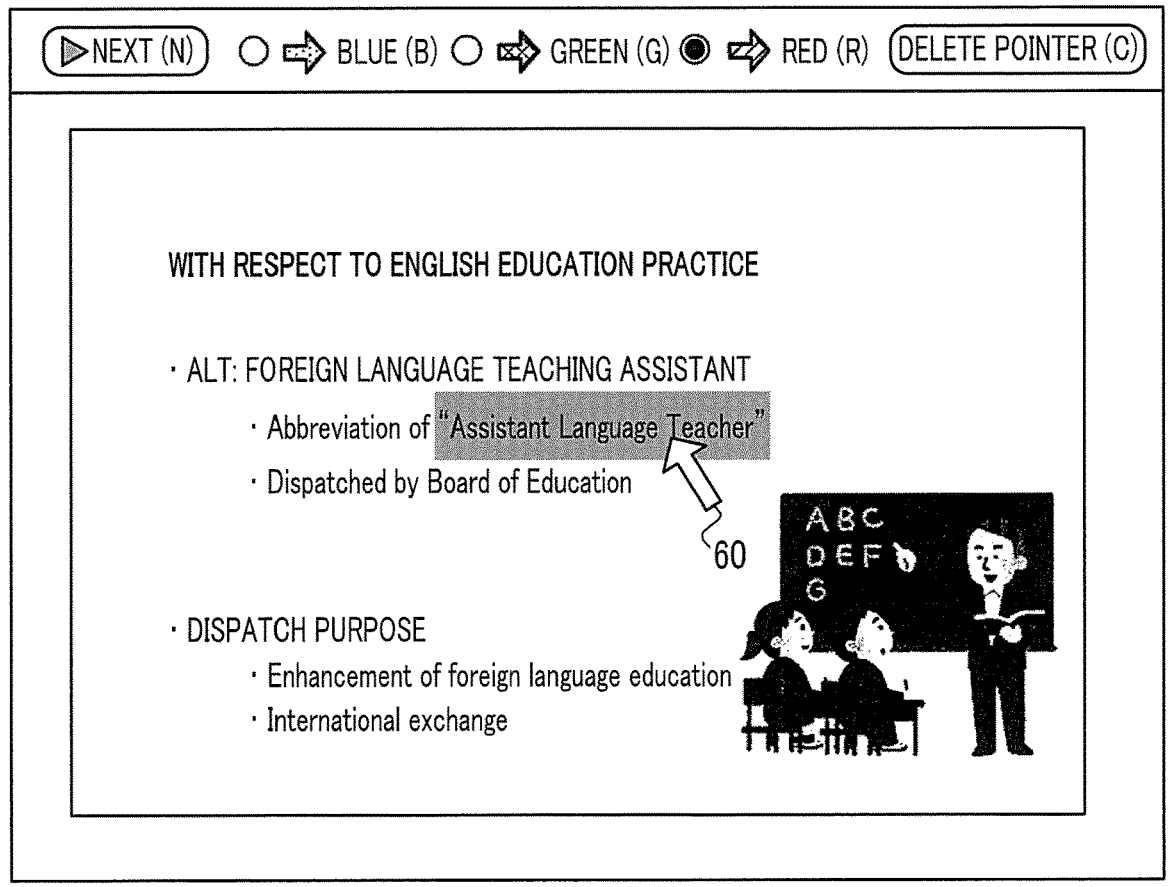
FIG. 12 is a diagram for explaining an operation in a case where a pointer is displayed in the vicinity of "Assistant Language Teacher" in the image data.

In a case where a file storing image data such as presentation materials of a lecture is selected on the above-described image/voice capturing screen, the editing processing server 10 acquires image data from the terminal device 20 (step S12), and stores the image data in the multimedia data storage unit 33. By clicking the page switching button 63 on the authoring tool screen as shown in FIG. 11, the image data set on the authoring tool screen can be switched. That is, image data to which a pointer, which is an example of a display object, is added can be switched by the page switching button 63. In a case where the pointer setting button 64 clicked on the authoring tool screen, a setting screen of a pointer which is an example of a display object as shown in FIG. 12 is displayed.

Figure 13:
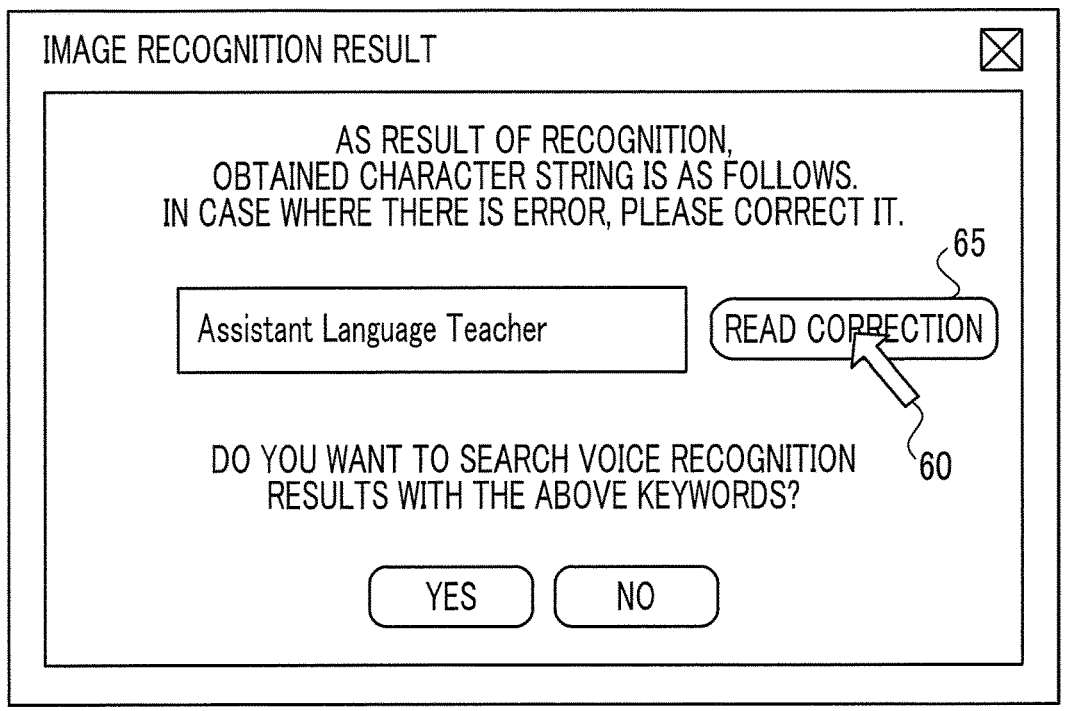
FIG. 13 is a diagram showing an example of a display screen showing an image recognition result of a character string specified in FIG. 12.

Then, in a case where in an area of a description to be emphasized in the image data, an area of a character string ("Assistant Language Teacher" in FIG. 12) to which a pointer is added is designated by using the cursor 60, the user operation reception unit 41 receives the character string as a specific character (step S13). Then, the image recognition section 43 of the editing processing server 10 executes an image recognition process on the specific character (step S14), and the display control section 45 performs control to display the image recognition result of the specific character as shown in FIG. 13. In a case where the image recognition result is incorrect, the result can be corrected on the display screen as shown in FIG. 13.

Then, a keyword matching or corresponding to (associated with) the specific character extracted as the image recognition result from the voice text data is retrieved and specified (step S15).

Here, as in the present exemplary embodiment, the expressions of the image recognition result and the voice recognition result may be different, in such a manner that the character string in the image text data extracted as the image recognition result is English, but the character string in the voice text data extracted as the voice recognition result is katakana and hiragana.

Figure 14:
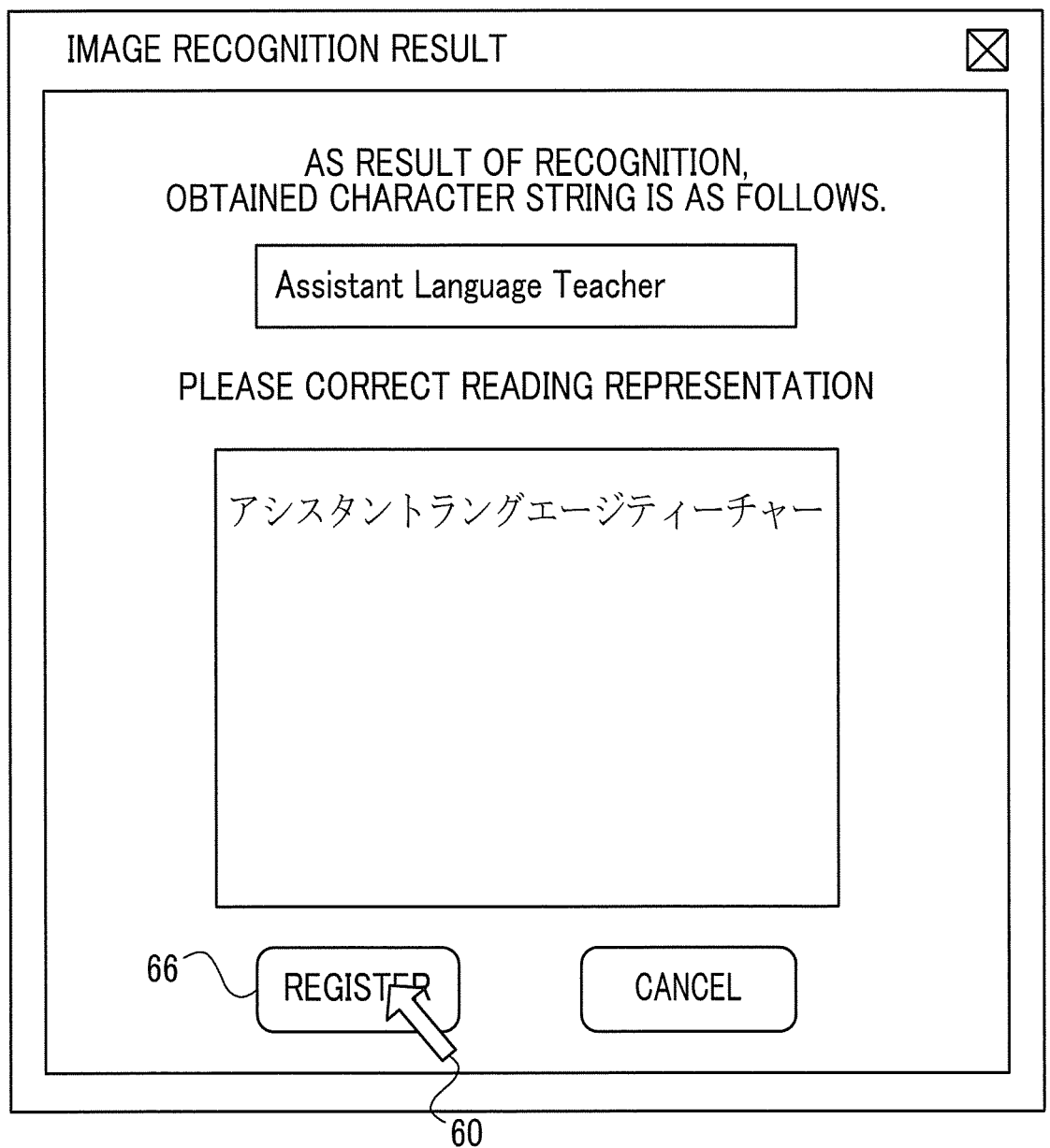
FIG. 14 is a diagram showing an example of a display screen in a case of correcting a read representation of the image recognition result.

Specifically, in a case where the image recognition result of the specific character is "Assistant Language Teacher", the expression of the image recognition result "Assistant Language Teacher" and the expression of the voice recognition result "アシスタントラングエ—ジティーチャー" (Japanese expression of "Assistant Language Teacher") do not match. In a case where the image recognition result and the voice recognition result do not match each other or may not match each other as described above, it is possible to correlate (associate) the image recognition result with the voice recognition result, by selecting the read correction button 65 on the image recognition result screen as shown in FIG. 13 and by correcting and registering the read representation of the image recognition result on the display screen as shown in FIG. 14. A plurality of correction registrations of the read representation can also be registered. Katakana and hiragana may be mutually compatible.

As the image recognition result, "アシスタントラングエ—ジティーチャー" matching the voice recognition result is registered, so the image recognition result, of which read representation is corrected and registered, is matched with or associated with and the voice recognition result. In a case where a keyword corresponding to a specific character is not detected, a display prompting to correct the read representation of the image recognition result may be displayed. For example, a read representation correction registration screen as shown in FIG. 14 may be displayed.

Then, the playback start time and the playback end time of the keyword of the voice recognition result matching or corresponding to (associated with) the specific character are set as the display start time and display end time (display period) of the pointer (step S16), and the display control section 45 performs control to dispose the pointer, with the central portion of the sentence head of the specific character as the end point of the arrow. The display start time and the display end time of the pointer may be corrected on the display screen.

In a case where there is a portion to which a display object such as a pointer is to be added in another image (Yes in step S17), the process returns to the process of step S13. In a case where there is no portion to which the display object is to be added in another image (No in step S17), the process is ended.

FIG. 15A is a diagram showing a part (sentence) of an entire sentence of a voice recognition result, and FIG. 15B is a diagram showing keywords (words) extracted from the voice recognition result and a playback start time and a playback end time of each keyword.

As shown in FIG. 15A and FIG. 15B, "アシスタントラングエ—ジティーチャー" which is a character string (keyword) in the voice text data is specified in correspondence with (in association with) the image recognition result of the specific character "Assistant Language Teacher", and the display control section 45 performs control such that the specified keyword is shaded and displayed so as to be different from other character strings. Further, the display control section 45 controls to display the playback start time and the playback end time of each keyword in the voice data.

Specifically, since "Assistant Language Teacher" which is the image text data of the specific character corresponds to "アシスタントラングエ—ジティーチャー" of the voice text data, the setting section 44 sets "00:04:29" which is the playback start time of the voice data "アシスタントラングエ—ジティーチャー" as the display start time of the pointer and "00:04:34" which is the playback end time as the display end time of the pointer.

Figure 16:
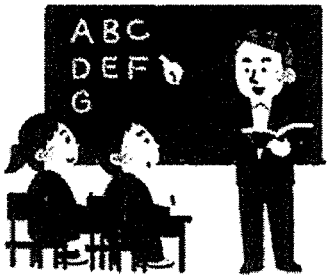
FIG. 16 is a diagram showing an example of a display screen in a case where the pointer 70 is added to a specified character string in image data to be displayed in synchronization with voice data.

Then, as shown in FIG. 16, the end point of the pointer 70 is added to the central portion of the sentence head of the specific character "Assistant Language Teacher" in the image data in synchronization with the voice data and displayed, and as shown in FIG. 17, the command added to the command setting area 71 of the preview screen is displayed. That is, "playback start time 0: 00: 04.29" is added as a command of pointer red display on the corresponding page of the presentation material. Further, "playback end time 0: 00: 04.34" is added as a command of pointer red hide. After the addition of the command, on the screen to be displayed, the preview screen is switched according to the command, and the playback of the voice continues.

Next, the operation of the editing processing server 10 in a case where there is an error in the voice recognition result will be described.

FIG. 18A and FIG. 18B are diagrams showing display screens in a case where there is an error in the voice recognition result. In the example of the display screen of the voice recognition result shown in FIG. 18A, the entire sentence is displayed, and a character string which may be erroneous is displayed so as to be distinguished from other character strings. Further, in the example of the display screen of the voice recognition result shown in FIG. 18B, the playback start time and the playback end time of each keyword is displayed, and a keyword which may be erroneous is displayed so as to be distinguished from other keywords.

Specifically, in FIG. 18A and FIG. 18B, a character string (keyword) that may be misrecognized is shaded and is displayed such that the user can check the voice recognition result. That is, after the user checks the image recognition result and the voice recognition result, the pointer can be displayed on the specific character in the image data to be displayed in synchronization with the voice.

In a case where the voice recognition result is incorrect, the voice recognition result can be corrected on the display screen as shown in FIG. 18A and FIG. 18B. Then, in a case where correction is made on one side of the display screen, the other is also corrected in conjunction.

Specifically, for example, in a case where "ELT" is corrected into "ALT" on the display screen displaying the entire sentence of the voice recognition result shown in FIG. 18A, in conjunction with this, "ELT" is also corrected into "ALT" on the display screen, shown in FIG. 18B, showing the playback start time and the playback end time of the keyword.

Figure 19:
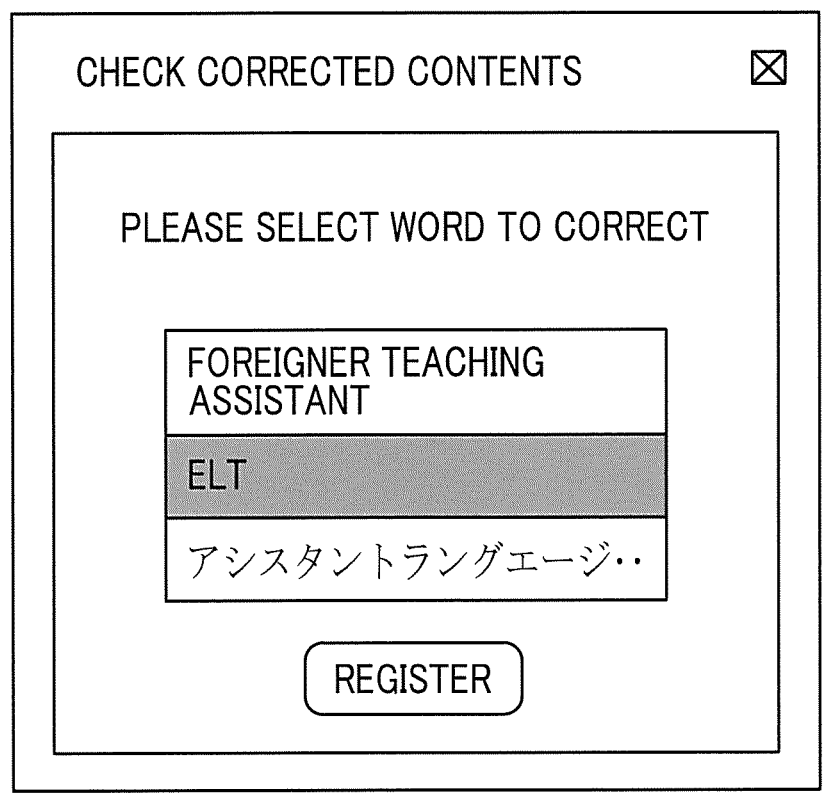
FIG. 19 is a diagram showing an example of a display screen in a case of correcting the voice recognition result.

Further, as shown in FIG. 19, the degree of approximation between the character string corrected in the sentence shown in FIG. 18A and the keyword shown in FIG. 18B is calculated, and then, as shown in FIG. 19, a character string which does not match but has a relatively high degree of approximation is extracted and displayed, so the user checks the character string. That is, the user can correct the voice recognition result with reference to the displayed word.

The configuration is described in which a specific character in the image data is received by designating the area of the specific character by using the cursor 60 in the above-described exemplary embodiment, but the present invention is not limited to this, and the cursor 60 may be disposed at a portion to which the pointer is added in the image data and an image recognition process may be performed on the preset area of the end point of the cursor 60 in the vicinity of the portion where the cursor 60 is disposed. At this time, the image recognition result of the area designated by the cursor 60 may be displayed as a candidate. Further, input means for inputting supplemental information to the image recognition result may be provided, and the image recognition process may be executed using the supplemental information input by the input means.

The configuration is described in which the pointer is added to the sentence head of the specific character in the image data to be displayed, in synchronization with voice, in the present exemplary embodiment, but the present invention is not limited to this, and the present invention can be applied to a configuration in which the pointer is added to a preset area such as the center of the specific character in the image data to be displayed, in synchronization with voice.

The configuration is described in which the pointer is added to the specific character in the image data to be displayed, in synchronization with voice, in the present exemplary embodiment, but the present invention is not limited to this, and the present invention can be applied to a configuration in which the specific character is displayed to be emphasized, such as adding a surrounding frame to the specific character in the image data to be displayed, in synchronization with voice, shading the specific character, underlining the specific character, thickening the character or changing the color of the specific character is thickened.

The configuration is described in which voice text data is generated by performing a voice recognition process on voice data, in the present exemplary embodiment, but the present invention is not limited to this, and the present invention can be applied to a configuration in which voice text data is generated by performing the voice recognition process on the moving image data. That is, the present invention is also applied to a configuration in which a display object is added to the image data to be displayed in synchronization with moving image data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An information processing apparatus comprising:
a processor, configured to:
   acquire voice data and image data;
   perform control to display the image data in synchronization with the voice data;
   perfoim voice recognition on the voice data and convert the voice data into voice text data;
   receive a display element to be added to a specific character in the image data for display;
   perform image recognition on the specific character in the image data and convert the specific character into image text data;
   set a playback period in which the voice text data matches the image text data corresponding to the specific character, as a display period of the display element in the image data; and
   perform control to display the display element on the specific character in the image data in the display period.

2. The information processing apparatus according to claim 1, wherein the processor is further configured to:
   correct the image text data converted from the specific character.
3. The information processing apparatus according to claim 1, wherein the processor is further configured to:
   add candidates for a read representation that is possibly included in the voice data, as the specific character.
4. The information processing apparatus according to claim 2, wherein the processor is further configured to:
   add candidates for a read representation that is possibly included in the voice data, as the specific character.
5. The information processing apparatus according to claim 3, wherein the processor is further configured to:
   suggest candidates for a read representation to be added.
6. The information processing apparatus according to claim 4, wherein the processor is further configured to:
   suggest candidates for a read representation to be added.
7. The infoiiiiation processing apparatus according to claim 1,
   wherein the specific character is a character string disposed in a preset area in image data indicated by the received display element.
8. The information processing apparatus according to claim 1,
   wherein the processor performs control to display a character string extracted from the voice text data.
9. The information processing apparatus according to claim 8, wherein the processor is further configured to:
   correct the character string.
10. The information processing apparatus according to claim 1,
    wherein the processor performs control to display a list of the character strings extracted from the voice text data.
11. The information processing apparatus according to claim 1,
    wherein the processor performs control to display a list of the character strings extracted from the voice text data and a playback period of the voice data of each character string.
12. The information processing apparatus according to claim 1,
    wherein in a case where the image text data matching the voice text data corresponds to a plurality of the specific characters, the processor performs control to display a character string corresponding to the specific characters as a candidate.
13. The information processing apparatus according to claim 12,
    wherein the processor performs control to display all the voice text data and display a character string corresponding to the specific character as a candidate by changing display thereof different from other character strings.
14. The information processing apparatus according to claim 12,
    wherein the processor performs control to display a candidate for a character string corresponding to the specific character together with contexts before and after the character string.
15. The information processing apparatus according to claim 12, wherein the processor is further configured to:
    play back a candidate for a character string corresponding to the specific character together with contexts before and after the character string.
16. A non-transitory computer readable medium storing a program causing a computer to execute:
    acquiring voice data and image data, respectively;
    controlling to display the image data in synchronization with the voice data;
    receiving a display element to be added to a specific character in the image data for display;
    performing voice recognition on the voice data and convert the voice data into voice text data;
    perform image recognition on the specific character in the image data and convert the specific character into image text data;
    setting a playback period in which the voice text data matches the image text data corresponding to the specific character, as a display period of the display element received in the receiving in the image data; and
    performing control to display the display element on the specific character in the image data in the display period.
17. The information processing apparatus according to claim 1, wherein the image text data includes a plurality first character strings, and the voice text data includes a plurality of second character strings, wherein the number of the first character strings is different from the number of the second character strings.

* * * * *